(12) United States Patent
Siddle

(10) Patent No.: US 6,399,851 B1
(45) Date of Patent: Jun. 4, 2002

(54) METHOD AND APPARATUS FOR REMOVING MERCURY AND ORGANIC CONTAMINANTS FROM SOILS, SLUDGES AND SEDIMENTS AND OTHER INERT MATERIALS

(76) Inventor: Herbert Siddle, P.O. Box 168, 13025 WCR Rd. #16, Fort Lupton, CO (US) 80621

(*) Notice: Subject to any disclaimer, the term of this patent is extended or adjusted under 35 U.S.C. 154(b) by 0 days.

(21) Appl. No.: 09/309,798

(22) Filed: May 11, 1999

(30) Foreign Application Priority Data

May 11, 1998 (CA) ............................................. 2237291

(51) Int. Cl.$^7$ ............................. A62D 3/00; F23B 1/12; F23B 7/00; C16G 11/00; A61L 11/00
(52) U.S. Cl. ..................... 588/228; 423/107; 588/209; 588/233; 422/1; 422/4; 422/307; 422/309; 110/342; 110/295
(58) Field of Search ................................. 422/255, 307, 422/308, 309; 210/180, 181, 774; 110/229, 219, 227, 342, 101 R, 243, 245, 225, 228, 295; 423/107; 588/228, 223, 209

(56) References Cited

U.S. PATENT DOCUMENTS

| | | | |
|---|---|---|---|
| 4,620,492 A | * 11/1986 | Vogg et al. ................. 110/345 |
| 4,667,609 A | * 5/1987 | Hardison et al. ............ 110/236 |
| 4,864,942 A | * 9/1989 | Fochtman et al. ........... 110/226 |
| 4,941,822 A | * 7/1990 | Evans et al. ................. 432/112 |
| 5,078,593 A | * 1/1992 | Schreiber, Jr. et al. ....... 432/103 |
| 5,174,750 A | * 12/1992 | Flading et al. .............. 432/115 |
| 5,205,225 A | * 4/1993 | Milsap, III ................... 110/240 |
| 5,221,512 A | * 6/1993 | Sancinelli ...................... 266/80 |
| 5,222,446 A | * 6/1993 | Edwards et al. ............. 110/235 |
| 5,325,795 A | * 7/1994 | Nelson et al. ............... 110/236 |
| 5,382,002 A | * 1/1995 | Evans et al. ................. 266/205 |
| 5,782,188 A | * 7/1998 | Evans et al. ................. 110/346 |

\* cited by examiner

*Primary Examiner*—Elizabeth McKane
*Assistant Examiner*—Monzer R. Chorbaji

(57) ABSTRACT

An apparatus for thermally separating mercury and organic contaminants from inert substrate materials (such as soil, sludges, sediments, drilling muds and cuttings), comprising an essentially air-tight processing chamber having a substrate inlet and a substrate outlet, said chamber having two or more troughs for processing of the substrate, a means for indirectly heating the chamber, a means for moving substrate through the two or more throughs of the chamber from the substrate inlet to the substrate outlet, and a vapour condensate handling system for removing and condensing vapours from the chamber for processing to remove and recover contaminants.

6 Claims, 4 Drawing Sheets

METHOD AND APPARATUS FOR REMOVING MERCURY AND ORGANIC CONTAMINANTS FROM SOILS, SLUDGES AND SEDIMENTS AND OTHER INERT MATERIALS

FIELD OF THE INVENTION

The present invention relates to a process for decontaminating inert substrate materials such as soils, sludges, sediments, drilling mud and cuttings, spent activated carbon, and wood. More particularly, the invention concerns an improved process and apparatus for thermally separating mercury and organic contaminants such as hydrocarbons, polychlorinated biphenyls (PCB's), pentachlorophenols (PCP's), polyaromatic hydrocarbons (PAH's), insecticides, herbicides, creosote, pesticides, dioxins and furans. The removed contaminants are removed as vapour without employing combustion, are collected and condensed for further treatment and recovery.

BACKGROUND OF THE INVENTION

Increasing attention has been paid to public health consequences of introducing industrial wastes, such as halogenated and non-halogenated organic compounds into the environment. As this attention has increased, governmental regulations have also been put in place to mandate the removal of these compounds to maximum permissible residual levels in the soils and other matrices of former disposal sites.

Traditionally, clean-up of disposal sites involved the procedure of removing contaminated soil or material to a designated secure land fill area. However, the number and volume of designated land fill areas has been greatly reduced and therefore a growing need to sanitize soils, and other matrices, with an efficient and economical treatment process is required.

In response to this need, portable incineration systems have been proposed, for example, U.S. Pat. No. 4,667,609 discloses a mobile apparatus for infrared heating of soils contaminated by various hydrocarbons. However, in incineration systems such as this the heating step is carried out to the point of complete combustion. Hence, operation of such a system would likely be precluded by governmental regulations which are extremely stringent with respect to the output of gases and the like from incineration systems.

An alternative to incineration is taught by U.S. Pat. No. 4,864,942 which discloses a method for removing organic compounds such as PCB's from soils by volatizing the organic compounds at temperatures well below what would be defined as "incineration". Generally speaking, these temperatures would not exceed 1200° F.

However, the time periods necessary for treatment to effect complete volatilization of contaminants, without combustion, are extremely slow and may well be an hour or more and in the case of mercury highly unlikely.

Accordingly, there is a need for an apparatus which can maximize the heat transfer to the substrate to be treated so as to minimize treatment time. Furthermore, thermal expansion of treatment chambers may also be a problem and there is therefore a need for a treatment chamber which can preferably respond to varying temperatures of the treatment process.

SUMMARY OF THE INVENTION

In a broader embodiment of the process according to the present invention, contaminants are separated from inert substrate materials such as soils, sludges, sediments and drilling muds and cuttings by a process that subjects inert materials contaminated with mercury or an organic compound to a temperature effective to volatilize the contaminants but below combustion temperature, with continuous removal, collection, condensation of all the vapours, for a period of time sufficient to effect the desired degree of contamination removal from the inert material and prevent the release of contaminated emissions.

When applying the inventive process and apparatus to decontaminate a large amount of material, the process is preferably carried out with an indirectly heated air tight extraction chamber consisting of a suspended double troughed chamber equipped with rotating augers which maximizes the heat transfer and minimizes dust to the substrate while eliminating difficulties caused by thermal expansion of prior art chambers.

Temperatures are controlled to keep the average soil temperature of material being processed at or below 600° C. to 650° C. to ensure high removal efficiencies. At these temperatures the volatilization component of the contaminated substrate vapourizes to form a vapour phase, leaving behind an inert solid phase. The vapour phase, which contains few fine solid particles, steam, air and vapourized contaminants such as hydrocarbons and PCB's, is continuously drawn off from the chamber and is subsequently collected, condensed and recovered for recycling or disposal by appropriate procedures.

Accordingly, the invention comprises an apparatus for separating contaminants form inert substrate materials, comprising an essentially suspended air-tight processing chamber having a substrate inlet and a substrate outlet, said chamber having two or more channels for processing of the substrate, a means for indirectly heating the chamber, a means for moving substrate through the two or more troughs of the chamber from the substrate inlet to the substrate outlet, and a vapour condensate handling system for removing and condensing vapours from the chamber to remove and recover contaminants.

The invention further comprises a method for separating mercury and organic contaminants from contaminated inert substrate materials comprising the steps of feeding inert solid material contaminated with mercury and/or organic compounds into a suspended treatment chamber heated externally with a heating means to such a temperature that the mercury and organic compounds are volatilized, moving said material through the chamber in a manner which exposes a maximum surface area of the inert solid material to the indirect heat within the chamber to assist in the rapid heating and processing of the material, removing the solids free of contaminants from the chamber, removing the vapour phase constituents from the chamber and conducting to a means for condensation and recovery of contaminants.

BRIEF DESCRIPTION OF THE DRAWINGS

These and other advantages of the invention will become apparent upon reading the following detailed description and upon referring to the drawings in which.

Figure 1:
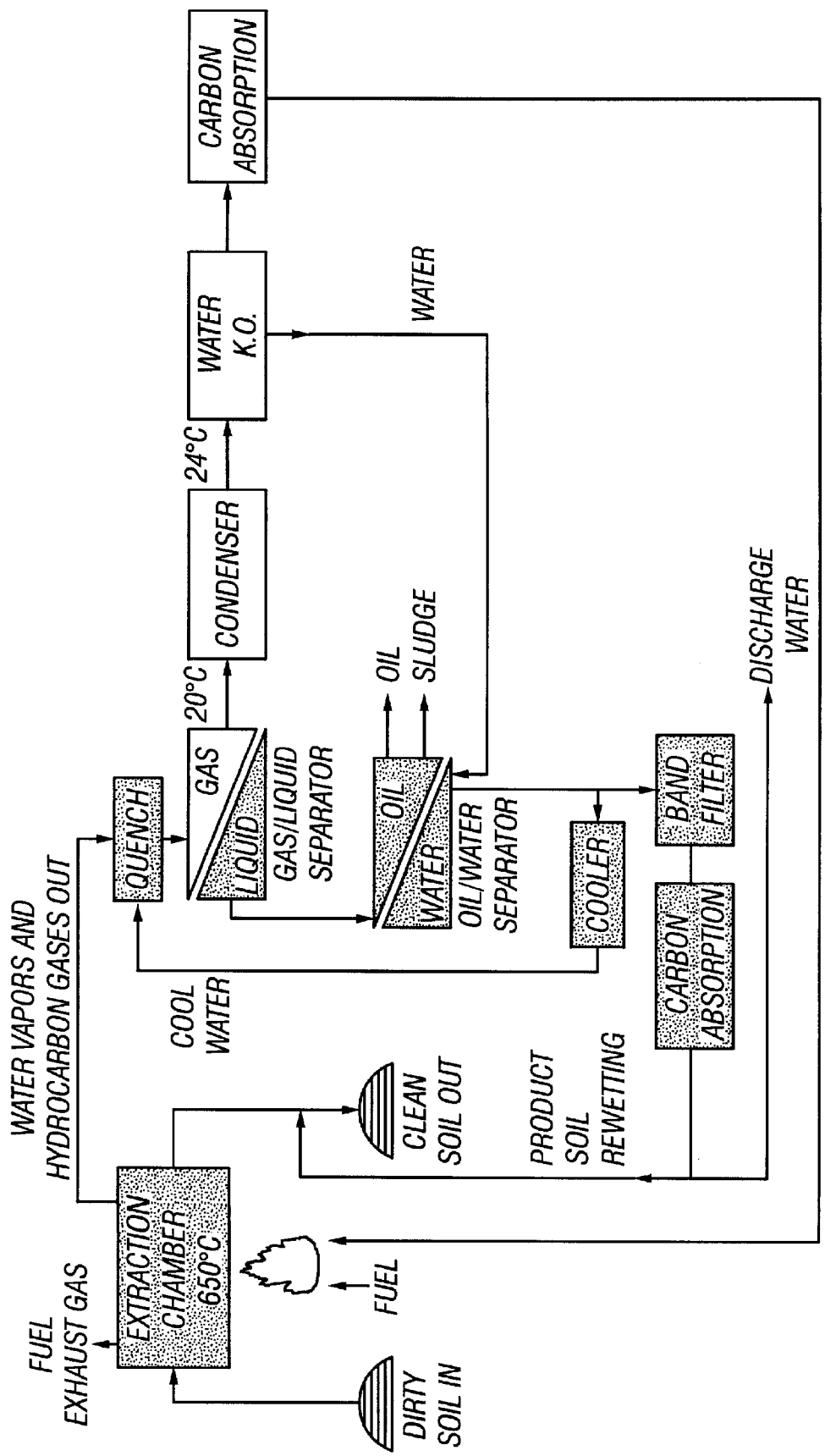
FIG. 1 is a process flow diagram of an exemplary operation for decontamination of substrates.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Many types of contaminated inert substrate materials, such as soil, sand, sludge, sediments, drilling muds and cuttings, spent activated carbon, wood, etc. can be successfully treated to remove mercury and all types of organic compounds such as hydrocarbons, PCB's, PCP's, PAH's, insecticides, herbicides, creosote, pesticides, dioxins, furans, and the process is found to be effective for a broad variety of such contaminants which are encountered in contaminated solid materials. While it is not possible to list every contaminant to which the presently claimed thermal separation process can be applied, examples of organic contaminants are as previously mentioned.

The present invention is a two-stage process. The first stage consists of using indirect heat transfer to volatilize contaminants from the substrate. This is referred to as the phase separation process. The second stage involves collecting and cooling the volatilized vapours/gases and condensing them into liquid form. The condensate is then separated into contaminant and water fractions. The two stage treatment process is shown schematically in FIG. 1. The process of the present invention consists of four particular handling stages: feed handling; thermal phase separation within the extraction chamber; treated substrate handling; and vapour treatment and recovery.

Prior to treatment, the feedstock material is screened to remove rock cobbles and debris, and then deposited into a feed hopper. The material is preferably fed from a feed hopper into a lump breaker by a horizontal conveyer belt. From the lump breaker the feed material is discharged onto an inclined conveyer for delivery to the extraction chamber.

The material is discharged from the inclined conveyor to a small hopper, which directs the feed material to two parallel rotary paddle airlock valves. Upon passing through the airlock valves, the substrate drops into the extraction chamber and is moved through the extraction chamber by two parallel screw augers. As the material moves through the extraction chamber, it gathers heat which is supplied to the extraction chamber from burners located externally and underneath the extraction chamber. The substrate remains physically separated from the combustion system by the extraction chamber's steel alloy shell. The firebox derives its heat by combustion of commercially available fuels and can be varied so that the temperature of the contaminated substrate material is elevated to the point that the contaminants in the material are volatilized. The treated substrate is then passed through a rotary airlock value at the end of the extraction chamber and is ready for re-wetting and re-introducing to the environment. The volatilized contaminants are fed from the combustion chamber to a vapour condensation and treatment system.

The volatilized water and contaminants generated in the extraction chamber are subject to a vapour/gas condensation and clean-up system for the purpose of collection and recovery of the contaminants in liquid form. The vapour/gas condensation and clean-up system preferably consists of six sequential treatment steps. Firstly, the hot volatilized vapours/gases from the extraction chamber are cooled through direct contact water sprays in a quench header and the water acquired by the quenching process is provided by spray nozzles spaced at regular intervals along the quench header. Secondly, the vapour/gas stream is then directed through one or more knock-out pots to remove residual particulate matter and large water droplets, preferably down to approximately 0.3 microns. Thirdly, the vapour/stream is preferably further cooled to a temperature less than 10° C. above ambient temperature by a cooling fan. Fourthly, the relatively dry gas stream of non-condensable gases is subjected to one or more mist eliminators for aerosol removal. Next, the gas stream is passed through a High Efficiency Air Filtration (HEAF) system to remove any submicron mists or particles still remaining in the stream. Glass media is used in the filter system to filter material down as a Microlite and, as such, the filters remove liquid mist down to a 0.05 micron level. Finally, the gas stream is then subjected to a final polishing in a series of carbon absorption beds and returned to the burners or vented to atmosphere. The carbon beds are operated in series to provide maximum polishing of the air stream.

Tables 1 and 2 provide a summary of the soil remediation results achieved by the process of the present invention with respect to a variety of locations and contaminants.

Figure 2:
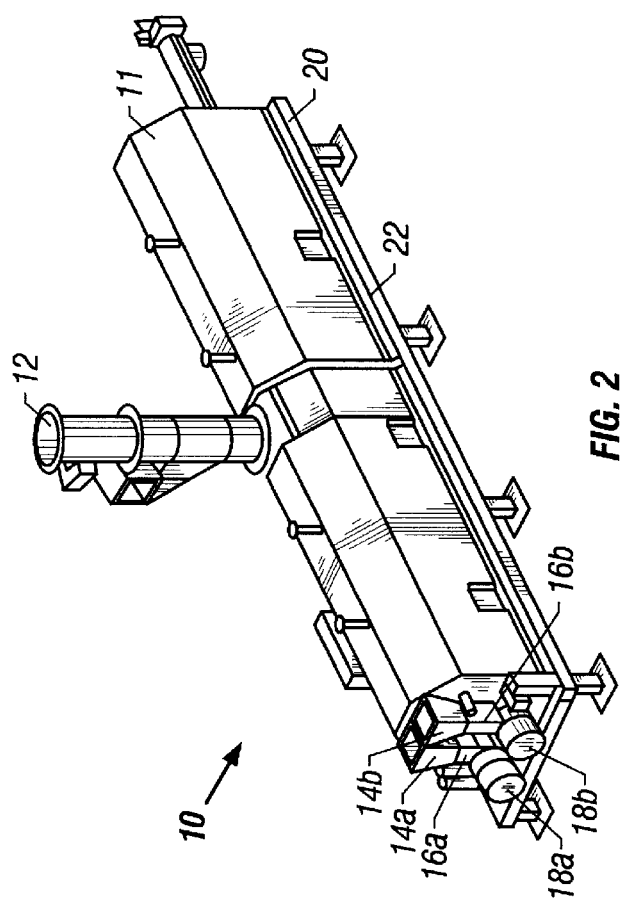
FIG. 2 is a perspective view of the processing apparatus incorporating the present invention.
Figure 3:
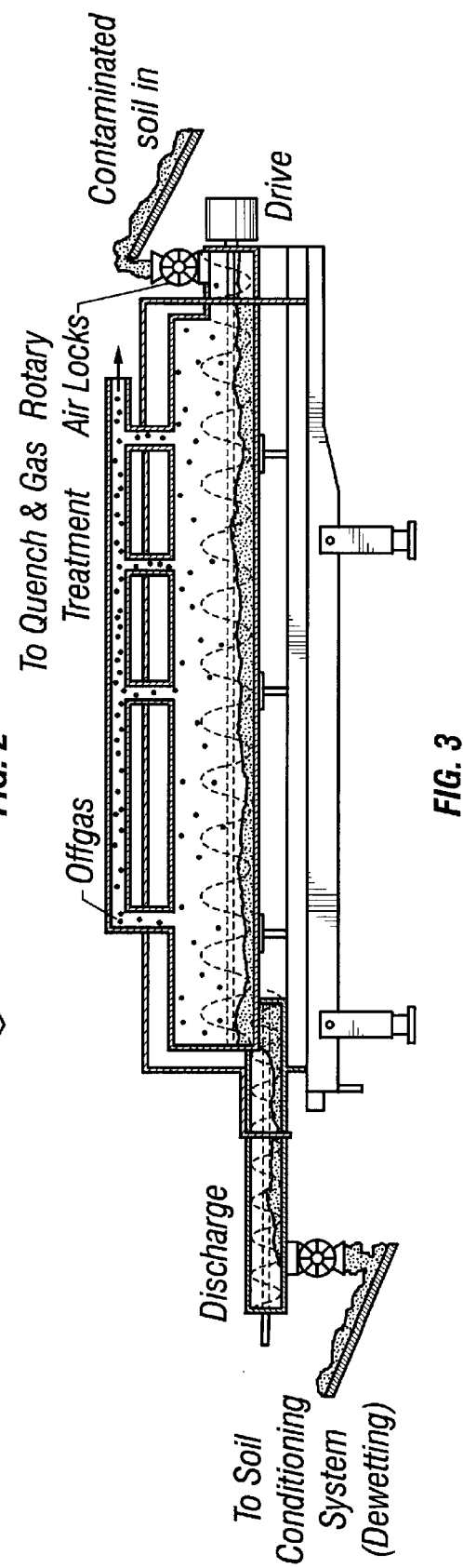
FIG. 3 is a side view of the processing apparatus of FIG. 2.
Figure 4:
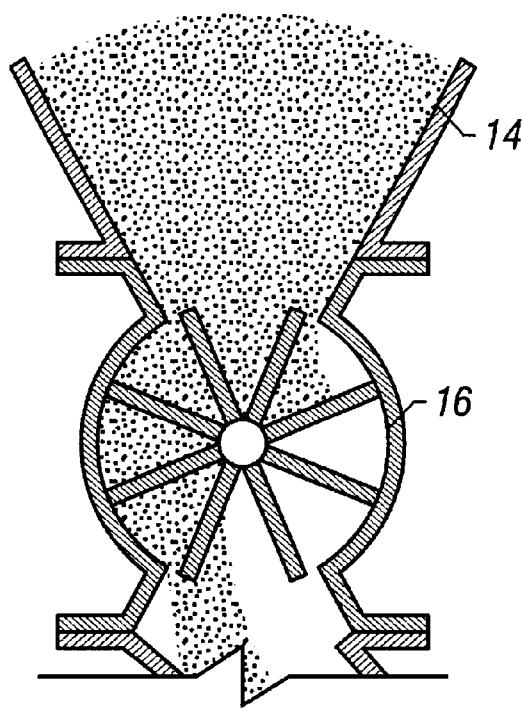
FIG. 4 is a cross-sectional view of a feed hopper air-lock of the processing apparatus.
Figure 5:
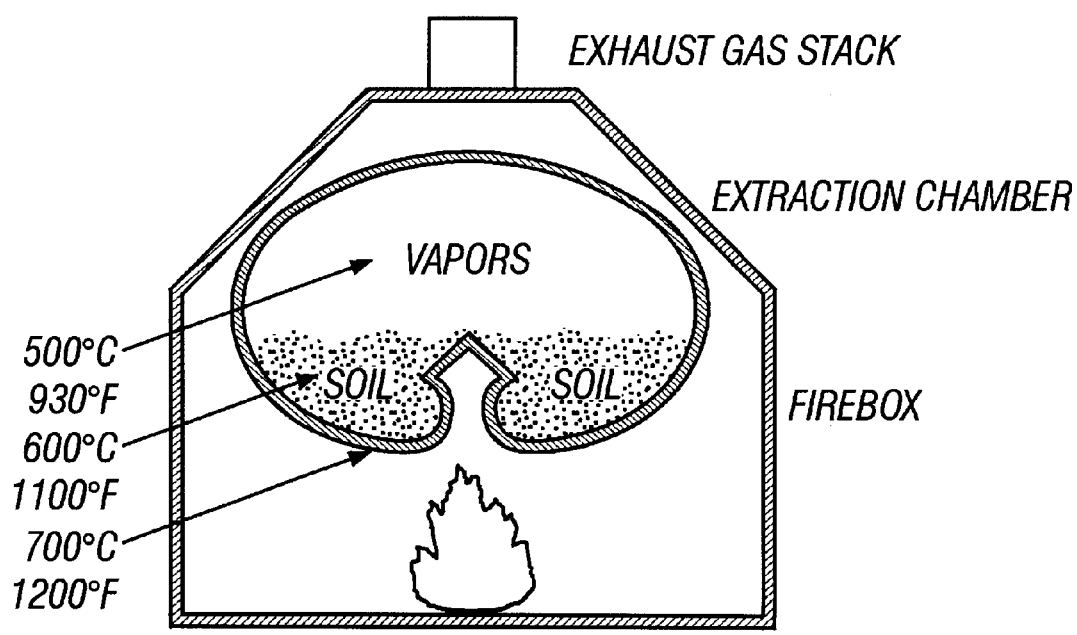
FIG. 5 is a cross-section view of extraction chamber of the present invention.

An embodiment of the invention is shown in FIG. 2. It consists of processing apparatus 10 having a firebox shell 11 and emergency exhaust stack 12. At a first end of the apparatus 10 there are in feed chute 14a and 14b, each of which is respectively connected to input rotary airlock valves 16 and 16b. Below the chutes 14a and 14b there are first and second screw drives 18a and 18b. At the second end of the apparatus 10 there is an output rotary airlock valve 24. The processing apparatus 10 is preferably mounted on support bed which has a plurality of support legs 22 mounted on a trailer with wheels.

Figure 6A:
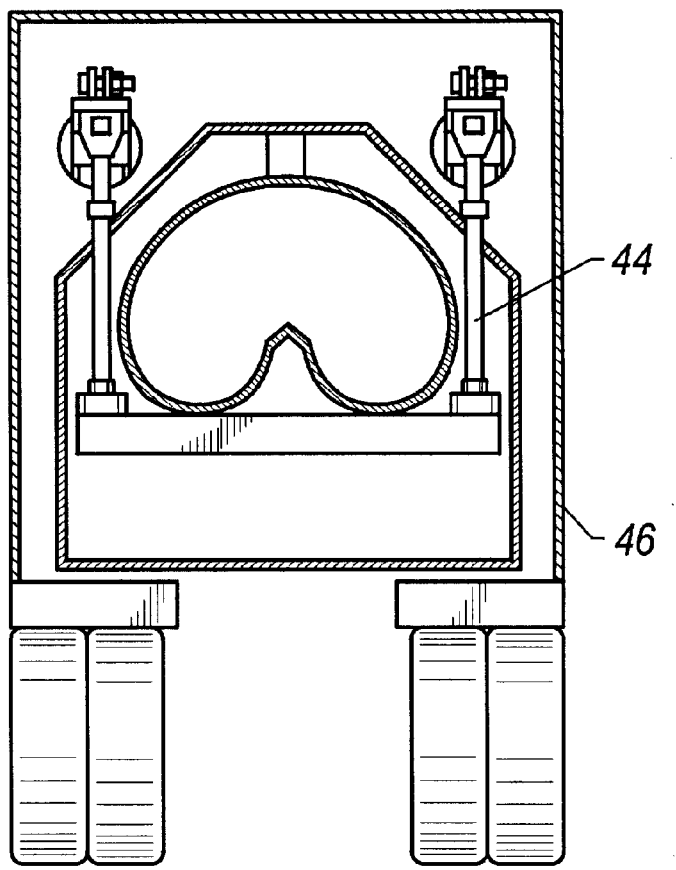
FIG. 6A is a cross-sectional view of the extraction chamber of the present invention suspended within a transportable unit.
Figure 6B:
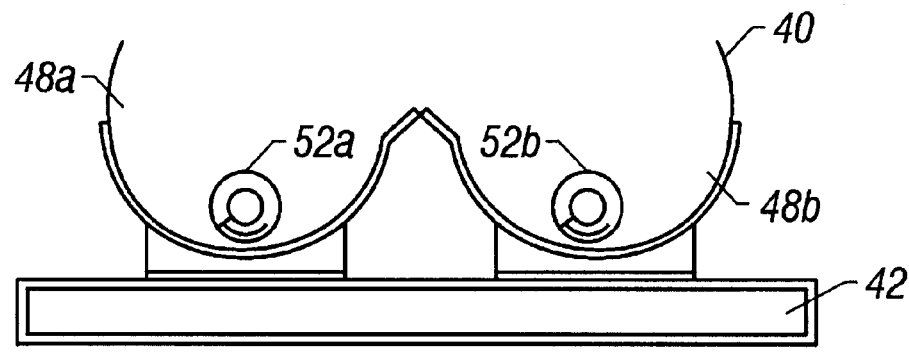
FIG. 6B is a partial cross-section of the base of the chamber of FIG. 6 showing auger placement and constant load support system.

The interior of the apparatus 10 is best seen in FIGS. 6 and 6A. Processing chamber 40 is suspended within the firebox shell 11. Preferably, the chamber is suspended in place using a cross-beam support 42 suspended from load members 44. In this manner the entire processing apparatus 10 can be mounted within the interior of a standard vehicle trailer 46. In this manner extraction chamber is supported inside the firebox 11 through a constant load support system means which supports the chamber 40 in a manner allowing for thermal expansion caused by temperature variations throughout the extraction chamber. The supports 44, as seen in FIG. 6, suspend the extraction chamber and provide a constant upward force of the chamber to counter downward forces caused by the weight of soil as the processing rate and steel temperature varies, thereby varying the downward force on the chamber, the support system automatically adjusts to provide the appropriate counter force. The method of support reduces the overall physical stress applied to the extraction chamber.

The constant load support system also allows the extraction chamber to grow longitudinally without having to overcome frictional forces. The longitudinal growth occurs as a result of thermal expansion caused by the temperature gradients of the chamber surfaces. This is achieved by pivoting the support structure to allow the system to swing as the chamber expands and contracts. The elimination of frictional forces also greatly reduces the localized stresses.

Chamber 40 has a generally "kidney shaped" profile in cross-section and, as such has two parallel troughs 48a and 48b each fitted with augers 52a and 52b. The trough of the chamber commence at the first end of the apparatus 10, immediately below the input rotary airlock valves 16a and 16b, and terminate at the second end of the apparatus 10, immediately above output rotary airlock valve 24.

Contaminated substrate is delivered to a feed hopper and is preconditioned to improve processability of the feed, for example by the removal of stones, etc. Where necessary, the material may also be pulverized, again to increase process ability. The amount of preconditioning depends upon, whether the feed material is wet or dry. If the feed is a wet sludge, preconditioning may involve adding detackifiers such as dried processed air fluent solids or sand in with the feed in the feed hopper, or by the addition of ash or lime.

The contaminated substrate material passes, under gravity, through one of the rotary air locks 16a or 16b and into a corresponding trough 48a or 48b of the chamber 40. Extraction chamber 40 which is surrounded by the firebox shell 11 within which a plurality of burners are located to heat the extraction chamber. Movement of the contaminated substrate through the extraction chamber is achieved by auger means 52a and 52b.

The extraction chamber is indirectly heated by means of externally located heaters, for example gas burners, in the firebox shell 11. The burners heat the shell of the extraction chamber, and the heat is conducted by the metal shell of the extraction chamber to the interior of the chamber. The flights of the augers 48a and 48b also help in the heat transfer. The burners are controlled to supply sufficient heat to carry out the process at a desired rate. Preferably, sensors inside the extraction chamber measure the average temperature so as the maximum soils temperature is maintained at a desired level in the range of above 600° C. to 650° C. to maximize processing efficiency.

As the feed is exposed to thermal energy inside the extraction chamber, the volatile components are vapourized. The longer the feed remains in the chamber, the greater the degree of removal of the contamination of the substrate. Preferably, the processing temperature will be 125° C. to 175° C. above the boiling point of the contaminant.

In the preferred embodiment the base of the extraction chamber has a generally "kidney shaped" configuration, within which the two augers are located to move the contaminated substrate through the extraction chamber. In this manner, maximum processing of the contaminated substrate is achieved in view of the increased surface area of the materials within the chamber.

In a preferred embodiment, the extraction chamber is preferably 12 metres long and each trough in the bottom section of the chamber is preferably 0.62 metres in diameter with a wall thickness of 0.013 metres. The top section of the extraction chamber is preferably 1.47 metres in diameter with a wall thickness of 0.006 metres. The shape of the extraction chamber as shown in FIG. 6 maximizes heat transfer to the soil and other matrices and minimizes thermal expansion of the chamber. The use of two troughs in the extraction chamber decreases the soil bed thickness as it moves through the chamber in the troughs and thus allows for greater surface contact between the hot chamber steel and the contaminated substrate. The troughs are covered by a common roof to form a single chamber.

The unit shown in FIG. 6 can be mounted on standard 40 foot trailers. By being transportable, the treatment system can be transported to the treatment site and set up for processing. The capability to treat materials at the treatment site represents a significant economy in that the cost of transporting large amounts of inert contaminated substrate from the effected site to a treatment facility is eliminated.

Thus, it is apparent that there has been provided in accordance with the invention a METHOD AND APPARATUS FOR REMOVING MERCURY AND ORGANIC CONTAMINANTS FROM SOILS, SLUDGES AND SEDIMENTS AND OTHER INERT MATERIALS that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

TABLE 1

Summary of Previous TPS Remediation Results
Summary of Project Remediation Results

| Contaminant and Location | Feed Soil Concentration (mg/kg) | Treated Soil Concentration (mg/kg) | Removal Efficiency (%) |
| --- | --- | --- | --- |
| Drill Cuttings & Oil Base Muds | | | |
| TPH | 271,000 | 302 | 99.9 |
| PAH Contaminated Soil | | | |
| Total PAHs (Spiked Soil) | 6,121 | 14.5 | 99.76 |
| Total PAHs (Coquitlam, BC, Canada) | 7,900 | 48.98 | 99.38 |
| Total PAHs (Surrey, BC, Canada) | 21,203 | 63.61 | 99.70 |
| Total PAHs (Manitoba, Canada) | 2,392 | 5.31 | 99.78 |
| Carcinogenic PAHs | 377.5 | 9.11 | 97.6 |
| PCP Contaminated Soil | | | |
| Total PCPs (Spiked Soil) | 1,556 | 3.07 | 99.80 |
| Total PCPs (Coquitlam, BC, Canada) | 12 | 0.10 | 99.17 |
| Total PCPs (Surrey, BC, Canada) | 12 | 0.33 | 97.25 |
| Total PCPs (Yukon, Canada) | 47 | 0.59 | 98.74 |
| Total PCPs (Manitoba, Canada) | 124.7 | 0.70 | 99.44 |
| PCB Contaminated Soil | | | |
| PCB 1242 (Alberta, Canada) | 521 | 1.71 | 99.67 |
| PCB 1242 (Alberta, Canada) | 352 | 5.99** | 98.3%** |
| PCB 1260 (DESRT Testing) | 169 | >0.066 | >99.96 |
| PCB 1260 (Newfoundland, Canada) | 175.2 | 0.24 | 99.86 |
| Dioxin and Furan Contaminated Soil | | | |
| Dioxins/Furans (TEQ) (Newfoundland, Canada) | 209.8 ppt | <2.7 ppt | >98.7 |
| Dioxins/Furans (TEQ) (Alberta, Canada) | 153 ppt | 3 ppt | >80 |

**Remediation criteria was 50 ppm.

TABLE 2

Typical Breakdown of PAH Analysis of Treated Soil

| PAH | Inlet Soil (mg/kg) | Treated Soil (mg/kg) | Removal Efficiency (%) |
|---|---|---|---|
| Naphthalene | 216.0 | 0.4199 | 99.81 |
| Acenapthylene | 77.2 | 1.2236 | 98.42 |
| Acenaphthene | 262.0 | 1.0679 | 99.59 |
| Fluorene | 87.6 | 0.4314 | 99.51 |
| Phenanthrene | 268.0 | 0.2073 | 99.92 |
| Anthracene | 189.2 | 0.2074 | 99.89 |
| Fluoranthene | 205.0 | 0.5711 | 99.72 |
| Pyrene | 117.0 | 0.5246 | 99.55 |
| Benzo(a)anthracene | 22.6 | 0.0597 | 99.74 |
| Chrysene | 59.0 | 0.0785 | 99.87 |
| Benzo(b)fluoranthene | 22.8 | 0.1812 | 99.21 |
| Benzo(k)fluoranthene | 9.6 | 0.0532 | 99.45 |
| Benzo(a)pyrene | 15.2 | 0.0519 | 99.66 |
| Indeno(1,2,3-cd)pyrene | 11.8 | 0.0771 | 99.35 |
| Dibenzo(a,h)anthracene | 14.5 | 0.1036 | 99.29 |
| Benzo(g,h,I)perylene | 11.7 | 0.0476 | 99.59 |
| Total PAHs | 2,392.4 | 5.301 | 99.78 |
| Average | 99.33 | 0.332 | 99.67 |

As shown in the previous tables, the invention has been successfully utilized to remediate soils contaminated with a variety of chlorinated and non-chlorinated hydrocarbons with typical removal efficiencies from the soil in excess of 99%.

What I claim as my invention:

1. An apparatus for separating contaminants from inert substrate materials, comprising:
    an essentially air-tight processing chamber suspended within a firebox, wherein said chamber has a substrate inlet and a substrate outlet, and said chamber having two or more troughs for processing of the substrate;
    a means for indirectly heating the chamber;
    a means for moving substrate through the two or more troughs of the chamber from the substrate inlet to the substrate outlet; and
    a vapour condensate handling system for removing vapour from the chamber for processing to remove and recover contaminants.

2. The apparatus according to claim 1 wherein the base of the processing chamber has a generally "kidney shaped" configuration.

3. An apparatus according to claim 1 mounted on one or more platforms, said apparatus and platforms adapted to being transportable.

4. An apparatus according to claim 1 wherein the means for moving the substrate through the troughs are screw augers.

5. An apparatus according to claim 1 wherein the means for moving the substrate is a screw auger within each of the two or more troughs for processing the substrate.

6. A method for separating mercury and organic contaminants from contaminated inert substrate materials comprising the steps of:
    feeding inert solid, sludge, sediment material comprising contaminated organic compounds into a suspended treatment chamber heated externally with a heating means to such a temperature that the mercury or organic compounds are volatilized;
    moving said material through the chamber in a manner which exposes a maximum surface area of the material to the surface area of the chamber to assist in the rapid heating, volatization, and processing of the material;
    removing the solids free of contaminants from the chamber;
    removing the vapour phase constituents from the chamber and conducting to a means for collection, condensation and recovery of contaminants.

* * * * *